July 25, 1967   W. C. THOMPSON   3,332,805
PORTABLE CASELESS DRY BATTERY ELECTRIC LAMP
Filed April 16, 1965   4 Sheets-Sheet 3
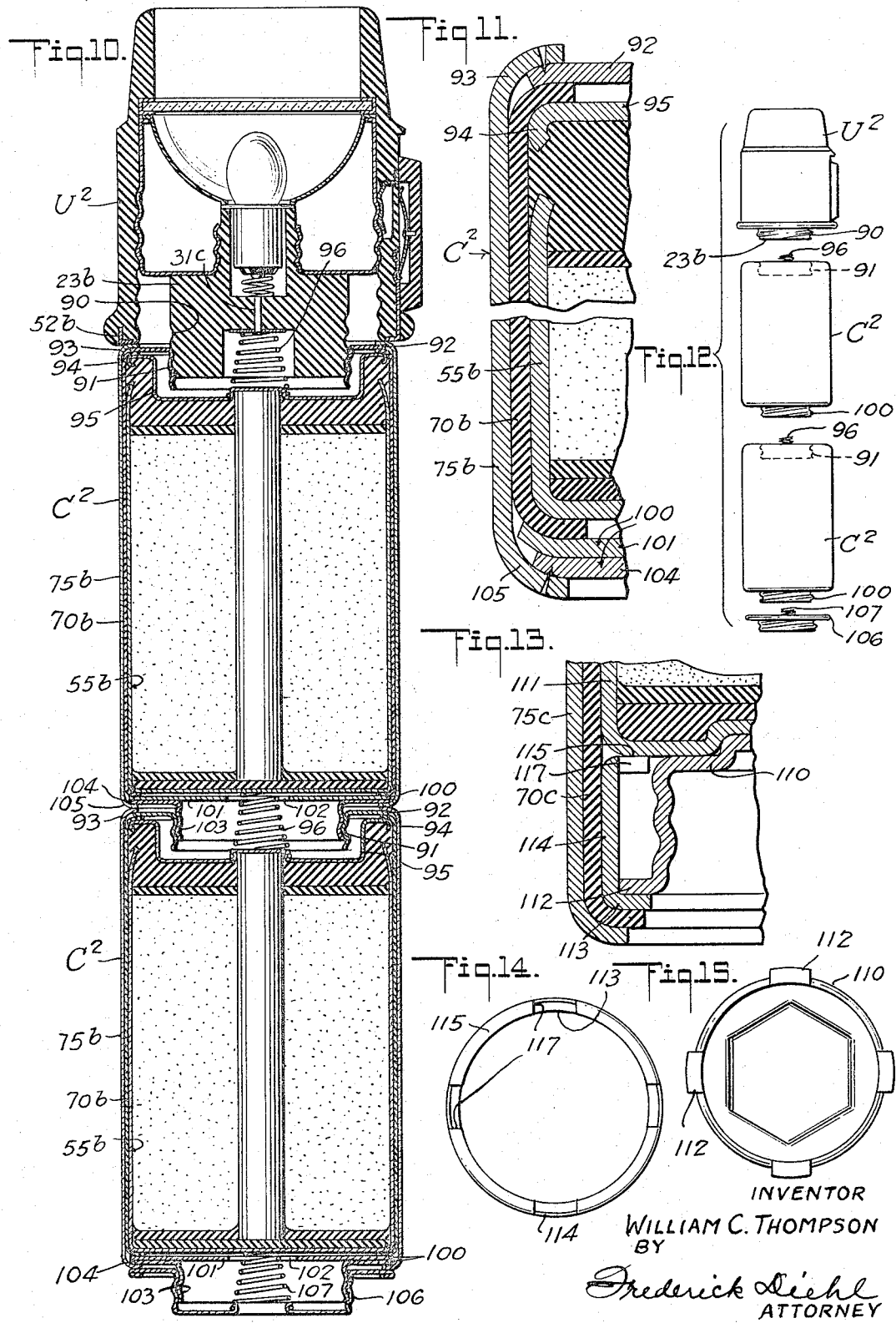
INVENTOR
WILLIAM C. THOMPSON
BY
Frederick Diehl
ATTORNEY

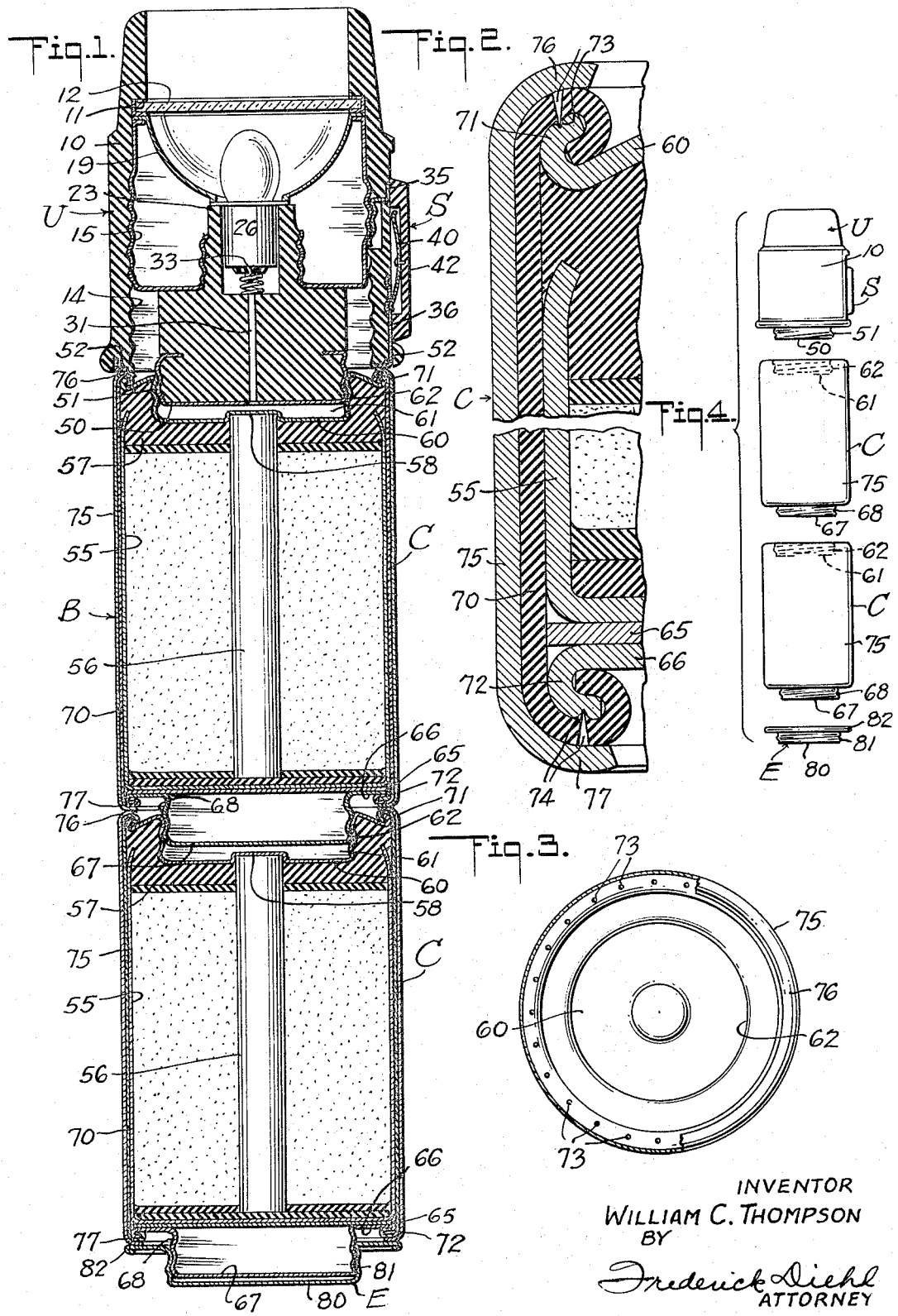

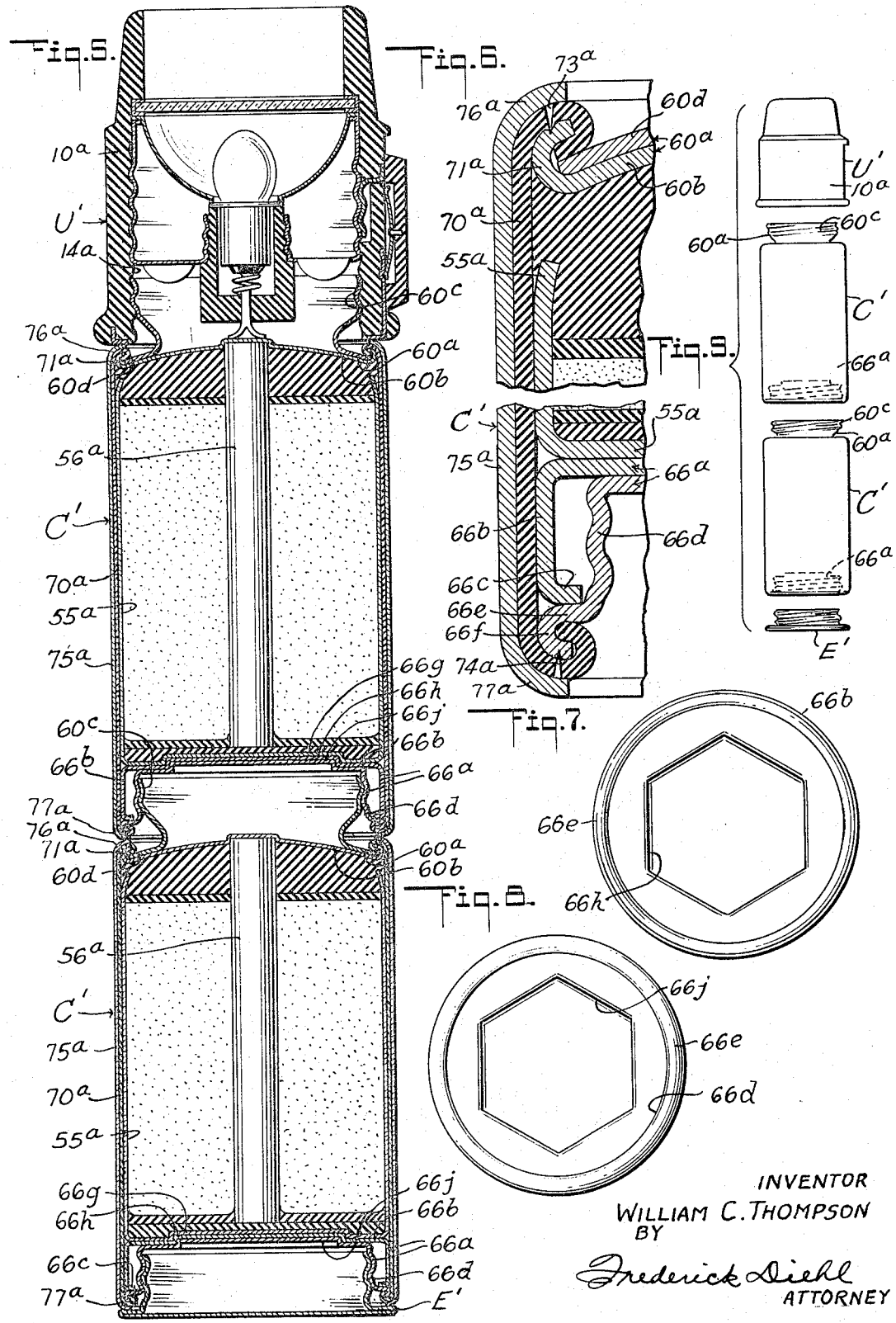

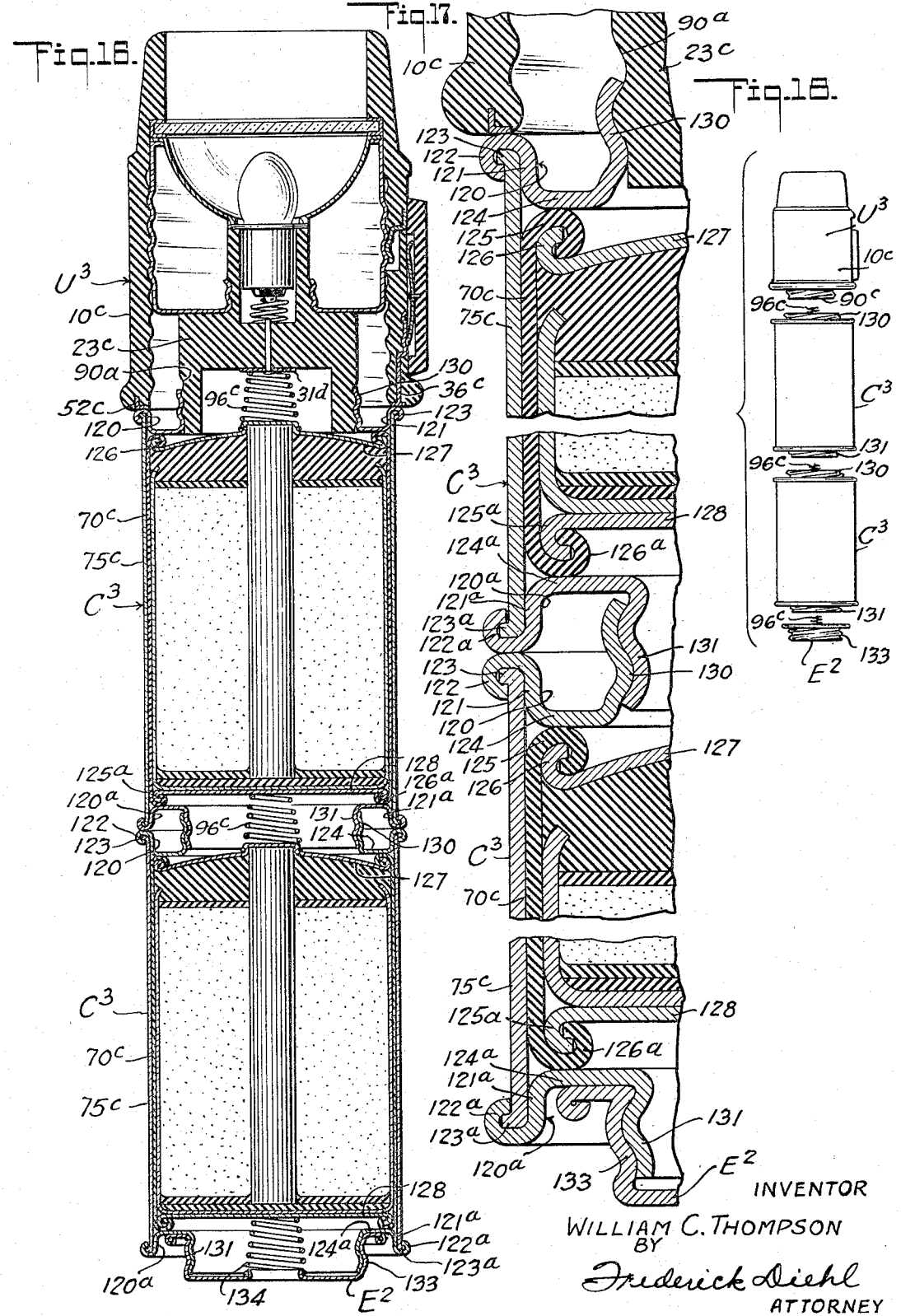

United States Patent Office 3,332,805
Patented July 25, 1967

3,332,805
PORTABLE CASELESS DRY BATTERY
ELECTRIC LAMP
William C. Thompson, P.O. Box 271,
Desert Hot Springs, Calif. 92240
Filed Apr. 16, 1965, Ser. No. 448,646
7 Claims. (Cl. 136—110)

ABSTRACT OF THE DISCLOSURE

This invention provides a male and female screw threaded connection between two or more identically constructed cells sealed at both ends by pressure plates against liquid leakage, which cells when secured together are electrically connected in series and form a rigid handle eliminating a separate case as well as enabling a permanent lamp and switch unit to be detachably secured to one end of the battery and a circuit bridging element detachably secured to the other end of the battery, all in such manner that current from the battery will be supplied to the lamp upon closing the switch.

---

This invention relates to portable electric lamps of the general character embodied in my United States Letters Patent No. 3,067,324, issued Dec. 4, 1962, and more particularly to a discardable handle-forming dry battery which is detachably secured directly to the permanent lamp and switch unit of the lamp and dispenses with a relatively expensive metal case containing the batteries.

The primary object of my invention is to provide a handle-forming battery particularly adapted, although not necessarily, for use in conjunction with the permanent lamp and switch unit disclosed and claimed in my patent above identified, the cells of which battery are structurally characterized by simple, rugged and inexpensively constructed means for detachably securing the cells to each other and to the unit in such manner as to enable all cells to be of identical and interchangeable construction for economical and efficient quantity production and assembly to form a complete caseless electric lamp having any desired number of cells in electrical series relationship, any one or more of which cells, when exhausted, can be removed from the assembly and replaced by a fresh cell with the utmost ease and dispatch.

Another object of my invention is to provide a dry battery cell which in a more specific aspect is constructed to provide co-axially related screw threaded attaching portions at the top and bottom ends of the cell, one of which portions has male screw threads and the other female screw threads, with the portions being of the same size, i.e., of the same structural and functional relationship as exists between a screw and a nut which fits the screw, so as to enable any number of the cells to be screwed together end to end, said portions being so electrically associated with the positive and negative electrodes, respectively, of the cell, that when cells are screwed together they will be automatically connected in electrical series.

A further object of my invention is to provide a dry cell battery of the above described character embodying a current- conducting element which is constructed to co-act with the screw threaded attaching portion at the bottom of the last cell of a number of assembled cells, to electrically connect one electrode of such last cell with the metal shell thereof to enable current to flow through the shells of the assembled cells in completing the series circuit through the cells when the switch of the permanent lamp and switch unit is closed.

Still another object of my invention is to provide an electric lamp as above set forth in which the permanent lamp and switch unit is structurally characterized by means enabling the screw threaded attaching portion at the top end of a cell to be securely and rigidly attached to the unit with one electrode of the cell electrically associated with one lamp contact of the unit, and the shell of the lamp electrically associated with a switch contact of the unit for co-action therewith in completing the electrically related portion of the circuit through such contacts when the switch is closed.

With these and other objects in view, my invention resides in the combinations, arrangements and functional relationships of elements as set forth in the following specification and particularly pointed out in the appended claims.

In the accompanying drawings:

FIGURE 1 is a longitudinal axial sectional view of a portable caseless dry battery electric lamp with one form of attaching means embodying my invention for detachably securing a plurality of cells in electrical series to each other and to the permanent lamp and switch unit;

FIGURE 2 is an enlarged fragmentary longitudinal sectional view of a cell illustrating detail construction of the attaching means at the top and bottom of the cell;

FIGURE 3 is a plan view, partly in section, of the top end of the cell shown in the preceding figures;

FIGURE 4 is an exploded view in side elevation of a complete two-cell lamp embodying the form of attaching means shown in the preceding figures;

FIGURE 5 is a view similar to FIGURE 1 and illustrating a second form of attaching means embodying my invention;

FIGURE 6 is an enlarged fragmentary longitudinal sectional view illustrating the detail construction of the attaching means at the top and bottom of the cells shown in FIGURE 5;

FIGURES 7 and 8 are plan views of the parts of a two-part attaching means at the bottom of the cells shown in FIGURES 5 and 6;

FIGURE 9 is an exploded view in side elevation of the complete two-cell lamp shown in FIGURE 5;

FIGURE 10 is a view similar to FIGURE 1 and illustrating a third form of attaching means embodying my invention;

FIGURE 11 is an enlarged fragmentary longitudinal sectional view illustrating detail construction at the top and bottom of the cells shown in FIGURE 10;

FIGURE 12 is an exploded view in side elevation of the complete two-cell lamp shown in FIGURE 10;

FIGURE 13 is an enlarged fragmentary longitudinal sectional view of a portion of the bottom end of a cell illustrating another form of two-part attaching means;

FIGURES 14 and 15 are plan views of the two parts of the attaching means shown in FIGURE 13.

FIGURE 16 is a view similar to FIGURE 1 and illustrating a fourth form of attaching means embodying my invention;

FIGURE 17 is an enlarged fragmentary longitudinal sectional view illustrating the detail construction at the top and bottom of the cells shown in FIGURE 16; and FIGURE 18 is an exploded view in side elevation of the complete two-cell lamp shown in FIGURE 16.

Referring specifically to the drawings and particularly to FIGURES 1 to 4, inclusive, a dry battery comprising two cells embodying my invention is shown attached to a combined lamp and switch unit U, which latter for the purpose of illustration only, is similar in construction to one of the forms disclosed in my United States Patent No. 3,067,324 above referred to and comprises a tubular body 10 of suitable electrical insulating material and of cylindrical form with open ends. The body 10 is provided with an annular shoulder 11 for a transparent cover 12 and is internally screw threaded at 14 for a metal supporting element 15 co-acting with a metal reflector 19 to secure the cover 12 in place.

A lamp holder 23 of electrical insulating material is screwed into a central opening in the element 15 and receives the base of an electric lamp 26 to rigidly support the lamp. A contact 31 in the holder 23 is engaged by the center contact 33 of the lamp 26 and is adapted to electrically co-act with the battery B in a manner to be later described. Contacts 35 and 36 of a switch S are molded in the wall of the body 10 with the contact 35 disposed to be engaged by the element 15. A bridging contact 40 in the actuating member 42 of the switch S is spaced from the contact 35 in the open position of the switch shown in FIGURE 1, whereas in the closed position of the switch the contact 40 engages the contact 35 and remains in engagement with the contact 36 so as to connect the contacts 35 and 36.

For the purpose of my present invention, the outer portion of the lamp holder 23 is enlarged in diameter and provided with a permanent cup shaped metallic attaching portion 50 connected centrally to the contact 31 of the holder and provided with male screw threads 51 for co-action with a cell C of the battery B in a manner to be later described. Molded in and exposed at the bottom end of the body 10 is a contact member in the form of a metal ring 52 connected to the switch contact 36 for co-action with the cell C in a manner to also be later described.

As all cells C are of identical construction, a detailed description of one cell will suffice for all. Each cell C is composed of a zinc cup 55 constituting the negative electrode containing a suitable electrolyte, depolarizing mix and a centrally located carbon pole 56 constituting the positive electrode. The active material is sealed in the cup 55 by a layer of a tarry substance 57 through which the carbon pole 56 projects into a recess 58 in a top pressure element or plate 60 having a socket 61 internally screw threaded at 62 to provide a female attaching portion fitting the male screw threads 51 of the lamp holder 23.

The bottom of the zinc cup engages the reinforcing disk 65 of a bottom pressure element or plate 66 provided with a cup shaped collar 67 externally screw threaded at 68 to provide a male attaching portion of the same size as the female attaching portion 62 of the cell so as to bear the same structural and functional relationship thereto as exists between a screw and a nut which fits the screw. A jacket 70 of electrical insulating material which is waterproofed, is wrapped around the zinc cup 55 and is interengaged with and crimped at its top and bottom ends in the curled perimeters 71 and 72 of the respective pressure plates 60 and 66 as shown clearly in FIGURE 2. The crimped ends of the jacket 70 are indented at a number of locations circumferentially by a sharp pointed tool (not shown) as indicated at 73 and 74 so as to press the jacket into the curled perimeters 71 and 72 of the pressure plates as shown in FIGURE 2 to lock the plates against turning. A metal shell 75 encloses the jacket 70 and is crimped at its ends partly over the crimped ends of the jacket as indicated by 76 and 77, to complete the structure of the cell.

When the female attaching portion 62 of the cell C is screwed tightly onto the male attaching portion 51 of the lamp holder 23 as shown in FIGURE 1, the cell will be rigidly secured to the unit U with the positive carbon pole 56 electrically connected to the lamp contact 31 through the portions 62 and 51, and the shell 75 will be electrically connected to the switch contact 36 by engagement of the crimped top 76 of the cell with the contact ring 52 of the unit U.

Upon screwing the female attaching portion 62 of a second cell C onto the male attaching portion 68 of the first cell until the crimped ends 77, 76 of the shells 75 of the cells tightly abut as shown in FIGURE 1, the shells will be electrically connected and the carbon pole 56 of the second cell will be electrically connected to the zinc cup 55 of the first cell, thus providing a series connection between the cells.

To complete the electrical circuit between the zinc cup 55 of the last cell of any number of cells forming the battery B, and the shell 75 of such cell, a removable bridging element E is provided and comprises a cup shaped cap 80 internally screw threaded at 81 to fit the male threads of the attaching portion 68 of the bottom pressure plate. From the cap 80 projects an annular flange 82 which engages the crimped bottom end 77 of the cell so as to complete a circuit from the zinc cup 55 and the shell 75 in the operation of the invention which is as follows:

Upon closing the switch S, current from the battery will flow from the carbon pole 56 of the first cell C through the lamp contact 31, filament of the lamp 26, reflector 19, supporting element 15, switch contact 35, bridging contact 40, switch contact 36, contact ring 52, shells 75 of both cells C, bridging element E, zinc cup 55 of the second cell and then through both cells in electrical series relation to complete the circuit and light the lamp.

Referring now to FIGURES 5 to 8, inclusive, the combined lamp and switch unit U' is identical in construction to the unit U with the exception that the enlarged portion of the lamp holder 23 and male screw threaded portion 51 of the unit U are omitted. Instead of such construction, the female screw threads 14a of the body 10a are utilized for a detachable connection between the body 10a and the first cell C' of two or more identical cells in series. For this purpose each cell has a two-part top pressure element 60a one part of which is in the form of a disk 60b engaged by the carbon pole 56a, and the other part is in the form of an externally screw threaded collar 60c constituting a male attaching portion fitting the threads 14a of the body 10a and having an annular flange 60d overlying the perimetral part of the disk 60b.

The insulating jacket 70a is wrapped upon the zinc cup 55a and is crimped at its upper end in the curled perimeter 71a of the disk 60b as clearly shown in FIGURE 6. The bottom end of each cell C' is also provided with a two-part bottom pressure plate or element 66a one part of which is in the form of a shallow cup 66b bearing against the bottom of the zinc cup 55a and of the same outside diameter as the zinc cup. The cup 66b is provided with an annular flange 66c projecting radially inward. The other part of the element 66a is in the form of an internally screw threaded shallow cup 66d to receive the collar 60c of the top pressure element 60a of another cell C', and is provided with an outwardly projecting annular flange 66e adapted to seat against the flange 66c of the cup 66b, and has a curled perimeter 66f.

The jacket 70a is also wrapped about the bottom pressure element 66a and is crimped around the curled perimeter 66f at which point the jacket is indented at 74a to lock the pressure element against turning in the cell when screwing one cell against another cell, all as clearly shown in FIGURE 6. To further aid in locking the pressure plate 66a against turning in the cell, the bottom of the zinc cup 55a, the bottom of the cup 66b and the bottom of the cup 66d are non-circularly recessed one into the other as indicated by 66g, 66h and 66j, respectively, in FIGURE 5. The top pressure element 60a is locked against turning by indenting the jacket 70a as indicated by 73a in FIGURE 6. The shell 75a is crimped partly over the ends of the jacket 70a as indicated by 76a and 77a so as to complete the cell. A bridging element E' is adapted to be screwed into the bottom pressure element 66a of the last cell C' to be connected in series, to function in the same manner as the previously described bridging element E. As the electrical operation of this form of the invention is the same as that previously described in connection with the first form of the invention, further description will be dispensed with.

Reference will now be had to FIGURES 10, 11 and 12 which illustrate a third form of my invention in which the lamp holder 23b of the unit U2, which is of insulating material, is externally screw threaded at 90 to receive an internally screw threaded collar 91 constituting a female attaching portion on each cell C2 and having an annular flange 92 clamped between the crimped upper end 93 of the shell 75b and the insulating jacket 70b which latter is crimped over the curled perimeter 94 of the top pressure element 95. The element 95 is insulated from the shell 75b and from the collar 91 by the jacket 70b, and is provided centrally with a contact spring 96 engaging the contact 31c of the holder 23b when the cell is screwed tightly to the unit U2 with the shell abutting the contact ring 52b.

The bottom end of each cell C2 is provided with a two-part pressure element 100, one part of which is a disk 101 having a clearance opening 102 through which passes the contact spring 96 to engage the bottom of the zinc cup of the preceding cell as shown in FIGURE 10. The other part of the pressure element 100 which constitutes the attaching portion to the next cell is in the form of an externally screw threaded collar 103 having an annular flange 104 over which is crimped the bottom end 105 of the shell 75b, with the crimped bottom end of the jacket 70b interposed between the zinc cup and the bottom pressure element 100, so as to complete the construction of this form of cell, the electrical operation of which is the same as previously described. A metal bridging element 106 having a contact spring 107 is screwed onto the pressure element 100 to carry the current of the last cell of a series from the zinc cup 55b to the shell 75b.

Reference will now be had to FIGURES 13, 14 and 15 which illustrate another form of two-part pressure element for the bottom of a cell, which comprises an internally screw threaded cup 110 seating against the bottom of the zinc cup 111 and having outwardly projecting lugs 112 upon which rests an inwardly projecting annular flange 113 of a ring 114 whose outside diameter is the same as that of the zinc cup 111. The ring 114 is provided with another inwardly projecting annular flange 115 seating against the zinc cup and having slots 117 to enable the flange to pass the lugs 112 in assembling the two parts of the pressure element.

Reference will now be had to FIGURES 16, 17 and 18 which illustrate a fourth form of my invention in which the lamp holder 23c of the unit U3, which is of electrical insulating material, is enlarged and externally screw threaded at 90a for co-action with any one of identically constructed cells C3.

Each cell C3 is provided with female and male attaching portions at opposite ends thereof which are in the form of shallow cups 120 and 120a, respectively, the side walls 121, 121a of which fit tightly into the ends of the shell 75c and are crimped at 122, 122a over lips 123, 123a formed on the respective ends of the cell as clearly shown in FIGURE 17, so as to rigidly secure the cups to the shell. The annular bottom walls 124, 124a of the respective cups 120 120a seat against the ends of the insulating jacket 70c of the cell which is crimped at its ends as indicated by 125, 125a in the curled perimeters 126, 126a of the positive and negative electrode pressure plates 127, 128, respectively.

Projecting axially from the inner diameters of the bottom walls 124, 124a of the respective cups 120, 120a are co-axially related collars 130 and 131, which are spaced from the side walls 121, 121a a sufficient amount for mechanism (not shown) to perform the crimping operation by which the cups are secured to the shell 75c. The collar 130 is internally screw threaded to fit the external screw threads 90a of the lamp holder 23c so as to enable a cell C3 to be screwed onto the lamp holder to rigidly secure the cell to the unit U3 with the end of the shell 75c tightly abutting and in electrical engagement with the metal contact ring 52c molded in the body 10c of the unit and connected to the switch contact 36c.

The collar 131 is externally screw threaded to fit the internaly screw threaded collar 130 of another cell C3 so as to enable any number of cells to be screwed together with the confronting ends of their shells 75c tightly abutting in electrical engagement and completely concealing the detachable screw threaded connection provided between the cells by the collars 130, 131. The top or positive electrode pressure plate 127 of each cell C3 is provided with a contact spring 96c which, on that cell attached to the unit U3, engages the contact 31d of the lamp holder 23c. The contact spring 96c of the next cell connected to the first cell engages the bottom or negative electrode pressure plate 128 of the first cell as clearly shown in FIGURE 16, all so as to electrically connect the electrodes of the cells in electrical series.

A bridging element E2 in the form of an internally screw threaded cap 133 having a yieldable contact 134, is screwed onto the collar 131 of the last one of the cells C3 connected in series, so as to function in the same manner as the previously described bridging elements E and E' in the operation of this form of my invention which is the same as also previously described.

From the foregoing description it will be manifest that all forms of my invention embody the same broad idea of providing screw threaded attaching means at the top and bottom ends of a battery cell with one means being male and the other female and of the same screw size so as to bear the same structural and functional relationship to each other and to the screw threaded attaching means of the permanent lamp and switch unit as a screw and a nut which fits the screw, all to the end of enabling any number of cells to be interchangeably connected to the unit and to each other in electrical series relationship and to form the handle of the lamp, whereby to dispense with the relatively expensive case of conventional portable lamps of the flashlight type.

I claim:

1. A dry cell comprising: a cup shaped negative electrode containing active material; a positive electrode in said active material; a jacket of insulating material receiving said negative electrode; a metal shell receiving said jacket; a positive electrode pressure element closing the top of the cell in electrical engagement with said positive electrode and insulated from said shell by said jacket; a negative electrode pressure element closing the bottom of the cell in electrical engagement with said negative electrode and insulated from said shell by said jacket; and attaching means at the top and bottom ends of the cell, with said attaching means at one end of the cell having male threads and said attaching means at the other end of the cell having female threads of the same screw size as said male threads so as to enable a plurality of such cells to be interchangeably connected with the ends of their shells abutting and their electrodes in electrical series relationship.

2. The combination as embodied in claim 1 including a metallic bridging element having screw threaded engagement with said negative electrode pressure element and engaging said shell to electrically connect them.

3. A caseless dry battery composed of a plurality of case-forming cells, each of which comprises a cup shaped negative electrode containing active material; a positive electrode in said active material; a jacket of insulating material receiving said negative electrode; a metal shell receiving said jacket; a positive electrode pressure plate closing the top of the cell in electrical engagement with said positive electrode and insulated from said shell by said jacket; a negative electrode pressure plate closing the bottom of the cell in engagement with said negative electrode and insulated from said shell by said jacket; said plates having screw threaded portions of one and the same screw size, with the threads of one plate being male and the threads of the other plate being female, the male threads of one cell and the female threads of another cell connecting the cells in end-to-end relation with their shells rigidly abutting in electrical engagement and the cells in electrical series.

4. The combination as embodied in claim 1 wherein said male and female threads are carried by said pressure elements in co-axial relationship with said threads disposed relative to the ends of the cell for a plurality of such cells to be interchangeably connected with the ends of their shells rigidly abutting when such cells are screwed together.

5. The combination as embodied in claim 1 wherein said pressure elements are in the form of plates sealing the ends of the cell against liquid leakage and mounting said male and female threads, respectively.

6. The combination as embodied in claim 1 wherein said male and female threads are carried by said pressure elements with said female threads being in the form of a socket and said male threads in the form of an externally screw threaded collar.

7. The combination as embodied in claim 1 wherein said attaching means is insulated from said electrodes by said jacket and having portions clamped between the jacket and shell to secure the attaching means to the cell in electrical contact with the shell; and a yieldable contact supported by said positive electrode pressure element for electrical engagement with the negative electrode of another identical cell when two cells are screwed together.

References Cited

UNITED STATES PATENTS

| | | | |
|---|---|---|---|
| 2,826,681 | 3/1958 | Anthony et al. | 240—10.61 |
| 2,938,111 | 5/1960 | Keilman | 240—10.61 |
| 3,067,324 | 12/1962 | Thompson | 240—10.66 X |
| 3,278,339 | 10/1966 | Reilly et al. | 240—107 |
| 3,278,340 | 10/1966 | Bell | 136—107 X |

FOREIGN PATENTS 494,929  3/1930  Germany.

NORTON ANSHER, Primary Examiner.

D. L. JACOBSON, Assistant Examiner.